United States Patent
Kurbasa et al.

(10) Patent No.: US 11,760,323 B2
(45) Date of Patent: Sep. 19, 2023

(54) WHEEL SPEED SENSOR SYSTEM, VEHICLE INCLUDING SAID WHEEL SPEED SENSOR SYSTEM AND METHOD OF PROCESSING WHEEL SPEED SIGNALS

(71) Applicant: HL MANDO CORPORATION, Gyeonggi-do (KR)

(72) Inventors: Josko Kurbasa, Waldsolms (DE); Josef Knechtges, Mayen (DE); Axel Kunkel, Stutensee (DE)

(73) Assignee: HL MANDO CORPORATION, Gyeonggi-Do (KR)

( * ) Notice: Subject to any disclaimer, the term of this patent is extended or adjusted under 35 U.S.C. 154(b) by 763 days.

(21) Appl. No.: 16/721,889

(22) Filed: Dec. 19, 2019

(65) Prior Publication Data

US 2020/0307534 A1 Oct. 1, 2020

(30) Foreign Application Priority Data

Nov. 5, 2018 (DE) .......................... 102018218837.8

(51) Int. Cl.
*B60T 8/32* (2006.01)
*B60R 16/023* (2006.01)
(Continued)

(52) U.S. Cl.
CPC .......... *B60T 8/329* (2013.01); *B60R 16/0232* (2013.01); *B60T 8/17* (2013.01);
(Continued)

(58) Field of Classification Search
CPC . B60T 8/329; B60T 8/17; B60T 8/171; B60T 8/172; B60T 8/34; B60T 8/885;
(Continued)

(56) References Cited

U.S. PATENT DOCUMENTS

2014/0100719 A1* 4/2014 Thibault ............... B60T 8/1703
701/3
2016/0311419 A1* 10/2016 Joyce ..................... B60T 8/171
(Continued)

FOREIGN PATENT DOCUMENTS

DE 10 2011 106 163 1/2013
DE 10 2015 110 965 1/2016
(Continued)

OTHER PUBLICATIONS

Office Action dated Aug. 14, 2019 for German. Patent Application No. 102018218837.8.

*Primary Examiner* — Hussein Elchanti
(74) *Attorney, Agent, or Firm* — Ladas & Parry, LLP

(57) ABSTRACT

The present disclosure relates to a wheel speed sensor system (1), comprising: one or more first wheel speed sensors (2a, 2b), a first application specific integrated circuit (ASIC) (4) configured to receive one or more first wheel speed signals from the one or more first wheel speed sensors (2a, 2b) and to convert the one or more first wheel speed signals to first wheel speed data, and a first electronic control unit (ECU) (6) configured to receive the first wheel speed data from the first ASIC (4) via a data link (8) between the first ECU (6) and the first ASIC (4); and one or more second wheel speed sensors (3a, 3b), a second ASIC (5) configured to receive one or more second wheel speed signals from the one or more second wheel speed sensors (3a, 3b) and to convert the one or more second wheel speed signals to second wheel speed data, and a second ECU (7) configured to receive the second wheel speed data from the second ASIC (5) via a data link (9) between the second ECU (7) and the second ASIC (5). The first ECU (6) is further configured to receive the second wheel speed data from the second ASIC (5) via a data link (13) between the first ECU (6) and the second ASIC (5), and the second ECU (7) is further
(Continued)

Figure 1:
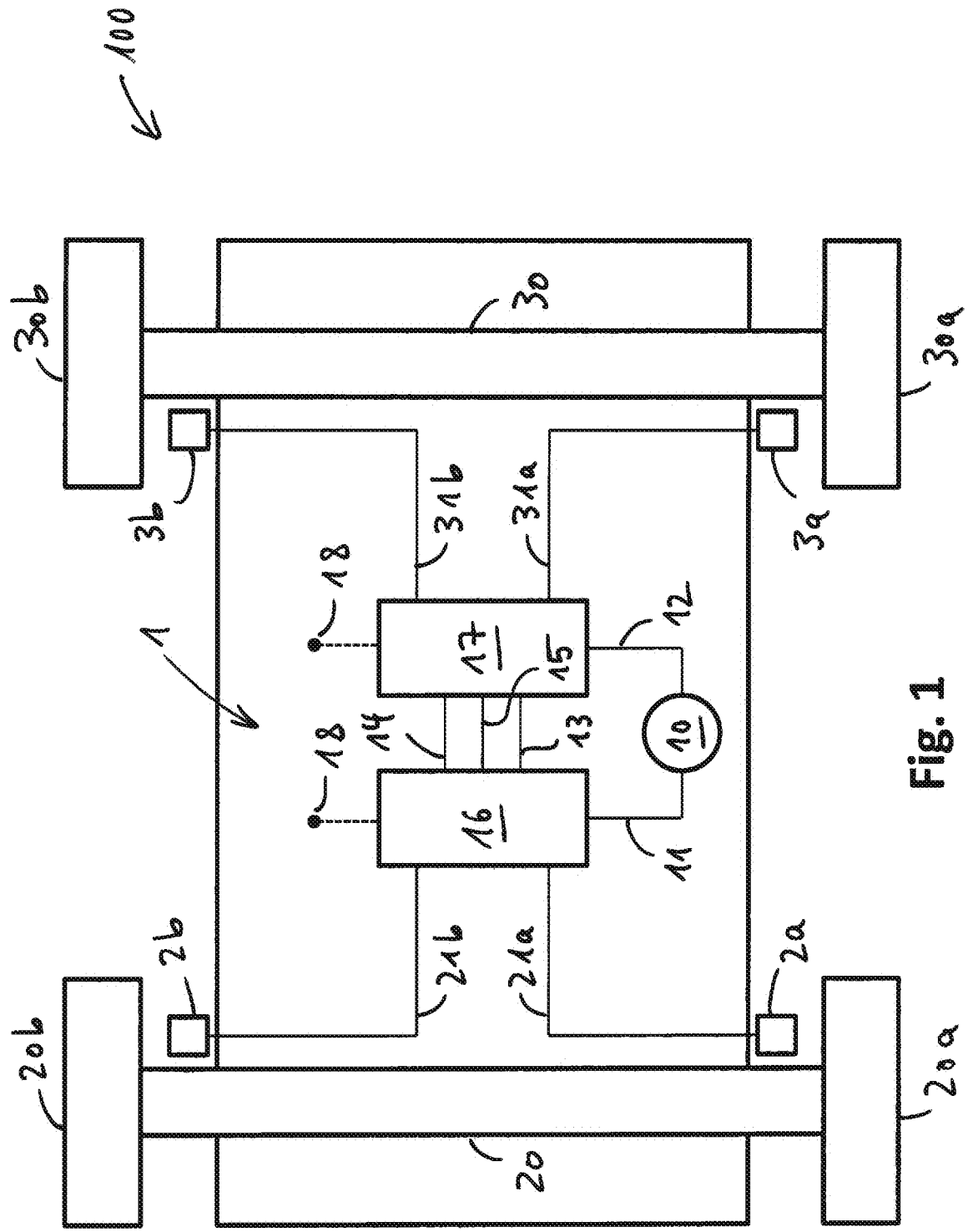

configured to receive the first wheel speed data from the first ASIC (4) via a data link (14) between the second ECU (7) and the first ASIC (4). The present disclosure further relates to a vehicle including said wheel speed sensor system and to a method of processing wheel speed signals.

13 Claims, 2 Drawing Sheets

(51) Int. Cl.

| | | |
|---|---|---|
| *B60T 8/17* | (2006.01) | |
| *B60T 8/171* | (2006.01) | |
| *B60T 8/172* | (2006.01) | |
| *B60T 8/34* | (2006.01) | |
| *B60T 8/88* | (2006.01) | |
| *B60T 8/96* | (2006.01) | |
| *B60T 13/74* | (2006.01) | |

(52) U.S. Cl.
CPC .............. *B60T 8/171* (2013.01); *B60T 8/172* (2013.01); *B60T 8/34* (2013.01); *B60T 8/885* (2013.01); *B60T 8/96* (2013.01); *B60T 13/745* (2013.01); *B60T 2240/00* (2013.01); *B60T 2270/402* (2013.01); *B60T 2270/406* (2013.01); *B60T 2270/413* (2013.01)

(58) Field of Classification Search
CPC ...... B60T 8/96; B60T 13/745; B60T 2240/00; B60T 2270/402; B60T 2270/406; B60T 2270/413; B60R 16/0232
See application file for complete search history.

(56) References Cited

U.S. PATENT DOCUMENTS

| | | | |
|---|---|---|---|
| 2017/0320487 A1* | 11/2017 | Greene | B60T 8/172 |
| 2017/0335912 A1* | 11/2017 | Koh | B60T 17/22 |
| 2018/0079398 A1* | 3/2018 | Baehrle-Miller | B60T 13/746 |
| 2018/0237014 A1* | 8/2018 | Nasu | B60W 10/02 |
| 2019/0039579 A1* | 2/2019 | Oh | B60T 13/586 |
| 2019/0054909 A1* | 2/2019 | Shah | B60T 8/885 |
| 2019/0101563 A1* | 4/2019 | Endres | G01R 33/07 |
| 2019/0299786 A1* | 10/2019 | Nakagawa | B60L 3/00 |
| 2020/0114893 A1* | 4/2020 | Kim | B60T 13/662 |
| 2020/0307534 A1* | 10/2020 | Kurbasa | G01P 3/44 |

FOREIGN PATENT DOCUMENTS

| | | |
|---|---|---|
| DE | 10 2017 209 721 | 10/2018 |
| DE | 10 2017 209 720 | 1/2019 |

\* cited by examiner

WHEEL SPEED SENSOR SYSTEM, VEHICLE INCLUDING SAID WHEEL SPEED SENSOR SYSTEM AND METHOD OF PROCESSING WHEEL SPEED SIGNALS

CROSS-REFERENCE TO RELATED APPLICATION

This application claims priority to German Patent Application No. 102018218837.8, filed on Nov. 5, 2018, the entire content of which is incorporated herein by reference.

The present disclosure relates primarily to a wheel speed sensor system, in particular for use in an automotive vehicle, to a vehicle including said wheel speed sensor system, and to a method of processing wheel speed signals.

Technologies related to self-driving cars, also termed autonomous or driver-less cars, play an increasingly significant role in the automotive industry. One of the most important aspects in the development of these technologies is car and passenger safety. With regard to vehicle control systems such as brake systems, a possible strategy to increase car and passenger safety includes the design of control architectures featuring redundancies so that in the case of malfunction or failure of a component one or more further components may take over the functionality of the defective component.

For example, DE102017209720A1 relates to a brake system having a redundant design including primary and secondary brake systems. Both brake systems safely decelerate the transportation vehicle and take over the function of the other brake system. The control of the safety-relevant process is based on the analysis of the signals of at least one sensor. A hardware architecture and a test mode for the hardware architecture are provided. A communications bus enables exchange of data between the primary and secondary ECUs. The at least one sensor of the hardware architecture connects to the primary ECU and to the secondary ECU. A sensor arrangement isolation circuit associated with the primary ECU and with the secondary ECU isolates the associated primary or secondary ECU from the at least one sensor.

Based on these known systems, the problem underlying the present disclosure consists in designing a wheel speed sensor system configured to compensate the failure or malfunction of system components and having a preferably simple architecture.

This problem is solved by a wheel speed sensor system and by a method of processing wheel speed signals according to the independent claims. The problem is further solved by a vehicle comprising said wheel speed sensor system. Special embodiments are described in the dependent claims.

The presently proposed wheel speed sensor system comprises:
one or more first wheel speed sensors,
a first application specific integrated circuit (ASIC) configured to receive one or more first wheel speed signals from the one or more first wheel speed sensors and to convert the one or more first wheel speed signals to first wheel speed data, and
   a first electronic control unit (ECU) configured to receive the first wheel speed data from the first ASIC via a data link between the first ECU and the first ASIC;
one or more second wheel speed sensors,
a second ASIC configured to receive one or more second wheel speed signals from the one or more second wheel speed sensors and to convert the one or more second wheel speed signals to second wheel speed data, and
   a second ECU configured to receive the second wheel speed data from the second ASIC via a data link between the second ECU and the second ASIC.

The first ECU is further configured to receive the second wheel speed data from the second ASIC via a data link between the first ECU and the second ASIC, and the second ECU is further configured to receive the first wheel speed data from the first ASIC via a data link between the second ECU and the first ASIC.

Due to the data link between the first ECU and the second ASIC, the first ECU may receive the second wheel speed data produced by the second ASIC even if the second ECU is defective or malfunctioning. And due to the data link between the second ECU and the first ASIC, the second ECU may receive the first wheel speed data produced by the first ASIC even if the first ECU is defective or malfunctioning. In this way it is guaranteed that in the event that one of the first ECU and the second ECU is defective or malfunctioning, the other ECU may receive both the first wheel speed data produced by the first ASIC and the second wheel speed data produced by the second ASIC.

Preferably, the data link between the second ASIC and the first ECU is configured as a direct data link between the second ASIC and the first ECU. For example, the data link between the second ASIC and the first ECU may comprise a cable or an optical fiber having a first end and a second end. The first end of this cable or optical fiber connecting the second ASIC with the first ECU may then be received in an output connector of the second ASIC, and the second end of this cable or optical fiber connecting the second ASIC with the first ECU may then be received in an input connector of the first ECU.

Similarly, the data link between the first ASIC and the second ECU is preferably configured as a direct data link between the first ASIC and the second ECU. For example, the data link between the first ASIC and the second ECU may comprise a cable or an optical fiber having a first end and a second end. The first end of this cable or optical fiber connecting the first ASIC with the second ECU may then be received in an output connector of the first ASIC, and the second end of this cable or optical fiber connecting the first ASIC with the second ECU may then be received in an input connector of the second ECU.

The first ECU typically comprises a programmable processing unit such as a microprocessor or a field programmable gate array (FPGA). Similarly, the second ECU typically comprises a programmable processing unit such as a microprocessor or an FPGA.

Converting the one or more first wheel speed signals to the first wheel speed data in the first ASIC typically includes converting the one or more first wheel speed signals to a data format which is readable by the first ECU. To that end, the first ASIC may include an analogue to digital converter for digitizing the one or more first wheel speed signals. For example, the first ASIC being configured to convert the one or more first wheel speed signals to the first wheel speed data may include the first ASIC being configured to convert the one or more first wheel speed signals to one or more first pulse-width-modulated (PWM) signals.

Similarly, converting the one or more second wheel speed signals to the second wheel speed data in the second ASIC typically includes converting the one or more second wheel speed signals to a data format which is readable by the second ECU. To that end, the second ASIC may include an analogue to digital converter for digitizing the one or more second wheel speed signals. For example, the second ASIC being configured to convert the one or more second wheel speed signals to the second wheel speed data may include the second ASIC being configured to convert the one or more second wheel speed signals to one or more second pulse-width-modulated (PWM) signals.

The one or more first wheel speed sensors typically include one or more magnetic or optical sensors configured to produce the one or more first wheel speed signals indicative of the rotational speed of one or more rotating or rotatable components such as one or more vehicle wheels. Similarly, the one or more second wheel speed sensors typically include one or more magnetic or optical sensors configured to produce the one or more second wheel speed signals indicative of the rotational speed of one or more rotating or rotatable components such as one or more vehicle wheels.

The wheel speed sensor system may further comprise at least one controllable device. The at least one controllable device may comprise at least one electric motor. For example, the at least one electric motor may be configured to drive a hydraulic piston for producing a hydraulic brake pressure. However, it is likewise conceivable that the controllable device comprises one or more electric switches or one or more electrically controllable valves, for example.

The first ECU may be configured to process the first wheel speed data and the second wheel speed data received by the first ECU to produce control data. The first ECU may then further be configured to control the at least one controllable device based on the control data produced by the first ECU. Similarly, the second ECU may be configured to process the first wheel speed data and the second wheel speed data received by the second ECU to produce the control data. The second ECU may then further be configured to control the at least one controllable device based on the control data produced by the second ECU. Again, this symmetry in the control architecture ensures that control of the controllable device is guaranteed even in the event that one of the first ECU and the second ECU is defective or malfunctioning.

The first ECU may be configured to determine whether the second ECU is defective. And if the first ECU determines that the second ECU is defective, the first ECU may further be configured to control the controllable device based on the control data produced by the first ECU. Similarly, the second ECU may be configured to determine whether the first ECU is defective. And if the second ECU determines that the first ECU is defective, the second ECU may further be configured to control the controllable device based on the control data produced by the second ECU.

The first ECU may further be configured to transmit the first wheel speed data received by the first ECU to the second ECU via a bidirectional data link between the first ECU and the second ECU. Similarly, the second ECU may be configured to transmit the second wheel speed data received by the second ECU to the first ECU via said bidirectional data link between the first ECU and the second ECU. Preferably, said bidirectional data link is configured as a direct data link between the first ECU and the second ECU. For example, the bidirectional data link may comprise a cable or an optical fiber having a first end and a second end. The first end of this cable or optical fiber connecting the first ECU with the second ECU may then be received in a connector or port of the first ECU, and the second end of this cable or optical fiber connecting the first ECU with the second ECU may then be received in a connector or port of the second ECU.

In a standard mode of operation when both the first ECU and the second ECU are operational, the first ECU may be configured to receive the second wheel speed data from the second ECU via said bidirectional data link between the first ECU and the second ECU. The first ECU may then be configured to operate as a master ECU. When the first ECU operates as the master ECU the first ECU is configured to control the controllable device based on the control data produced by the first ECU.

The wheel speed sensor system may further comprise a control area network (CAN) BUS. The first ECU and the second ECU may then be configured to exchange at least one of the first wheel speed data, the second wheel speed data and the control data via this CAN BUS. That is, the first ECU may be configured to transmit at least one of the first wheel speed data, the second wheel speed data and the control data to the second ECU via this CAN BUS. Similarly, the second ECU may be configured to transmit at least one of the first wheel speed data, the second wheel speed data and the control data to the first ECU via this CAN BUS.

The wheel speed sensor system may further comprise a first printed circuit board (PCB) and a second PCB separate from the first PCB. The first ASIC and the first ECU may both be disposed on the first PCB. And the second ASIC and the second ECU may both be disposed on the second PCB. Arranging the first ASIC and the first ECU and the second ASIC and the second ECU on separate PCBs may further increase the robustness of the wheel speed sensor system against possible failures occurring on one of the two PCBs.

A vehicle comprising the above-described wheel speed sensor system may further comprise a first axle as well as a first left wheel and a first right wheel coupled to the first axle at opposite ends of the first axle. And the vehicle may further comprise a second axle as well as a second left wheel and a second right wheel coupled to the second axle at opposite ends of the second axle.

The above-mentioned one or more first wheel speed sensors may include a first left wheel speed sensor disposed on or at the first left wheel. The first wheel speed sensor may be configured to produce a first left wheel speed signal indicative of a speed of the first left wheel. And the one or more first wheel speed sensors may include a first right wheel speed sensor disposed on or at the first right wheel. The first right wheel speed sensor may be configured to produce a first right wheel speed signal indicative of a speed of the first right wheel.

The above-mentioned one or more second wheel speed sensors may include a second left wheel speed sensor disposed on or at the second left wheel. The second left wheel speed sensor may be configured to produce a second left wheel speed signal indicative of a speed of the second left wheel. And the one or more second wheel speed sensors may include a second right wheel speed sensor disposed on or at the second right wheel. The second right wheel speed sensor may be configured to produce a second right wheel speed signal indicative of a speed of the second right wheel.

The presently proposed method of processing wheel speed signals comprises:

transmitting one or more first wheel speed signals from one or more first wheel speed sensors to a first ASIC, converting the one or more first wheel speed signals to first wheel speed data using the first ASIC, and transmitting the first wheel speed data from the first ASIC to a first ECU via a data link between the first ASIC and the first ECU, and transmitting the first wheel speed data from the first ASIC to a second ECU via a data link between the first ASIC and the second ECU;

transmitting one or more second wheel speed signals from one or more second wheel speed sensors to a second ASIC, converting the one or more second wheel speed signals to first wheel speed data using the second ASIC, and transmitting the second wheel speed data from the second ASIC to the second ECU via a data link between the second ASIC and the second ECU, and transmitting the second wheel speed data from the second ASIC to the first ECU via a data link between the second ASIC and the first ECU.

The method may comprise:

processing the first wheel speed data and the second wheel speed data received by the first ECU to produce control data, and controlling at least one controllable device based on the control data produced by the first ECU; or processing the first wheel speed data and the second wheel speed data received by the second ECU to produce the control data, and controlling the at least one controllable device based on the control data produced by the second ECU.

The method may comprise determining whether the second ECU is defective, and, if it is determined that the second ECU is defective, controlling the controllable device based on the control data produced by the first ECU.

The method may comprise determining whether the first ECU is defective, and, if it is determined that the first ECU is defective, controlling the controllable device based on the control data produced by the second ECU.

The method may comprise transmitting the first wheel speed data received by the first ECU from the first ECU to the second ECU via a bidirectional data link between the first ECU and the second ECU. Additionally or alternatively, the method may comprise transmitting the second wheel speed data received by the second ECU from the second ECU to the first ECU via said bidirectional data link between the first ECU and the second ECU.

When both the first ECU and the second ECU are operational, the method may comprise transmitting the second wheel speed data received by the second ECU from the second ECU to the first ECU via the bidirectional data link between the first ECU and the second ECU. The method may then further include the step of controlling the controllable device based on the control data produced by the first ECU based on the first wheel speed data received by the first ECU via the data link between the first ASIC and the first ECU and based on the second wheel speed data received by the first ECU via the bidirectional data link between the first ECU and the second ECU.

Figure 2:
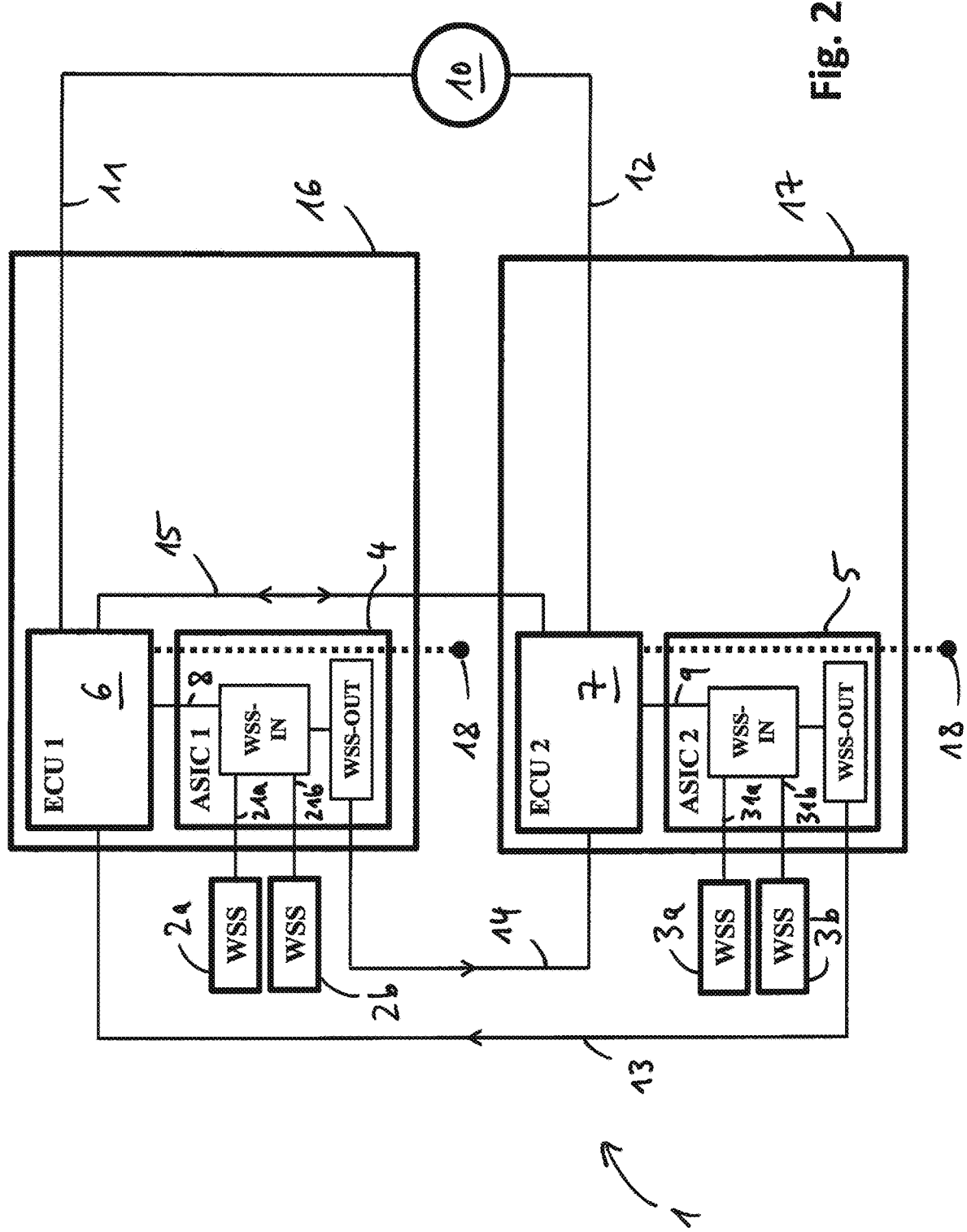

An embodiment of the presently proposed wheel speed sensor system and of the presently proposed method is described in the following detailed description and depicted in the accompanying drawing in which FIG. 1 schematically depicts a vehicle including a wheel speed sensor system; and FIG. 2 schematically depicts the wheel speed sensor system of FIG. 1.

FIG. 1 shows an automotive vehicle 100 including a front axle 20, a rear axle 30, a front left wheel 20a, a front right wheel 20b, a rear left wheel 30a and a rear right wheel 30b. The wheels 20a, 20b are mounted on opposing ends of the front axle 20, and the wheels 30a, 30b are mounted on opposing ends of the rear axle 30. The vehicle 100 further includes a wheel speed sensor system 1 comprising a front left wheel speed sensor (WSS) 2a disposed at the front left wheel 20a, a front right WSS 2b disposed at the front right wheel 20b, a rear left WSS 3a disposed at the rear left wheel 30a, and a rear right WSS 3b disposed at the rear right wheel 30b. Each of the wheel speed sensors 2a, 2b, 3a, 3b may comprise a magnetic sensor or an optical sensor, for example.

The wheel speed sensor system 1 further comprises a first printed circuit board (PCB) 16, a second PCB 17 separate from the first PCB 16 and at least one controllable device 10. The controllable device 10 may include an electric motor, an electric switch or a controllable valve, for example. For instance, the controllable device 10 may be configured to influence or to control a hydraulic pressure in one or more brake cylinders for braking the wheels 20a, 20b, 30a, 30b. The wheel speed sensors 2a, 2b are in communication with the first PCB 16 via communication lines 21a, 21b, and the wheel speed sensors 3a, 3b are in communication with the first PCB 17 via communication lines 31a, 31b. The controllable device 10 is in communication with the PCBs 16, 17 via communication lines 11, 12. And the PCBs 16, 17 are in communication with one another via data links 13, 14 and via a bidirectional data link 15. Moreover, each of the PCBs 16, 17 is in communication with a controller area network (CAN) BUS 18 of the vehicle 100 so that the PCBs 16, 17 may furthermore communicate with one another via the CAN BUS 18.

A more detailed illustration of the wheel speed sensor system 1 is depicted in FIG. 2, wherein the same features shown in FIGS. 1 and 2 are designated with the same reference signs in FIGS. 1 and 2. FIG. 2 shows that the first PCB 16 comprises a first application specific integrated circuit (ASIC) 4 and a first electronic control unit (ECU) 6, and that the second PCB 17 comprises a second ASIC 5 and a second ECU 7. The first ECU 6 and the second ECU 7 may include one or more microprocessors or one or more field programmable field arrays (FPGAs), for example.

The front left WSS 2a and the front right WSS 2b are configured to produce wheel speed signals indicative of a rotational speed of the front left wheel 20a and of the front right wheel 20b, respectively, and to transmit these wheel speed signals to an input of the first ASIC 4 via the communication lines 21a, 21b. The first ASIC 4 is configured to receive the wheel speed signals from the WSSs 2a, 2b and to convert them to first wheel speed data. The first wheel speed data have a format which is readable by the first ECU 6 and by the second ECU 7. To that end, the first ASIC 4 may include an analogue to digital converter, for example. For instance, the first wheel speed data produced by the first ASIC 4 may include one or more pulse width modulated (PWM) signals. The first ASIC 4 is configured to transmit the first wheel speed data to the first ECU 5 via a data link 8 connecting the first ASIC 4 with the first ECU 5. Additionally, the first ASIC 4 is configured to transmit the first wheel speed data to the second ECU 7 via the data link 14 connecting the first ASIC 4 with the second ECU 7. For example, the data link 14 connecting the first ASIC 4 with the second ECU 7 may be configured as a cable or as an optical fiber that directly links an output connector or output port, for example a low voltage output connector or a low voltage output port, of the first ASIC 4 with an input connector or input port of the second ECU 7.

Similarly, the rear left WSS 3a and the rear right WSS 3b are configured to produce wheel speed signals indicative of a rotational speed of the rear left wheel 30a and of the rear right wheel 30b, respectively, and to transmit these wheel speed signals to an input of the second ASIC 5 via the communication lines 31a, 31b. The second ASIC 5 is configured to receive the wheel speed signals from the WSSs 3a, 3b and to convert them to second wheel speed data. The second wheel speed data have a format which is readable by the first ECU 6 and by the second ECU 7. To that end, the second ASIC 5 may include an analogue to digital converter, for example. For instance, the second wheel speed data produced by the second ASIC 5 may include one or more pulse width modulated (PWM) signals. The second ASIC 5 is configured to transmit the second wheel speed data to the second ECU 7 via a data link 9 connecting the second ASIC 5 with the second ECU 7. Additionally, the second ASIC 5 is configured to transmit the second wheel speed data to the first ECU 6 via the data link 13 connecting the second ASIC 5 with the first ECU 6. For example, the data link 13 connecting the second ASIC 5 with the first ECU 6 may be configured as a cable or as an optical fiber that directly links an output connector or output port, for example a low voltage output connector or a low voltage output port, of the second ASIC 5 with an input connector or input port of the first ECU 6.

Moreover, the first ECU 6 is in communication with the second ECU 7 via the bidirectional data link 15 and via the CAN BUS 18. Again, the bidirectional data link 15 connecting the first ECU 6 with the second ECU 7 may be configured as a cable or as an optical fiber that directly links an output connector or output port of the first ECU 6 with an input connector or input port of the second ECU 7. That is, the first ECU 6 may transmit the first wheel speed data received by the first ECU 6 to the second ECU 7 via the bidirectional data link 15 and/or via the CAN BUS 18. Similarly, the second ECU 7 may transmit the second wheel speed data received by the second ECU 7 to the first ECU 6 via the bidirectional data link 15 and/or via the CAN BUS 18.

The first ECU 6 is configured to process the first wheel speed data and the second wheel speed data received by the first ECU 6 to produce control data and to control the controllable device 10 based on these control data. For example, the first ECU 6 may be configured to compare the wheel speed of one or more of the wheels 20*a*, 20*b*, 30*a*, 30*b* with a target wheel speed value and to transmit one or more control signals to the controllable device 10 via the communication line 11, wherein the one or more control signals are based on the wheel speed of one or more of the wheels 20*a*, 20*b*, 30*a*, 30*b* and based on the target wheel speed value. For instance, the first ECU 6 may be configured to determine that the wheel speed of one or more of the wheels 20*a*, 20*b*, 30*a*, 30*b* is above the target wheel speed value and to transmit a control signal to the controllable device 10 that prompts the controllable device 10 to decelerate one or more of the wheels 20*a*, 20*b*, 30*a*, 30*b* until their wheel speed reaches the target wheel speed value.

Similarly, the second ECU 7 is configured to process the first wheel speed data and the second wheel speed data received by the second ECU 7 to produce control data and to control the controllable device 10 based on these control data. For example, the second ECU 7 may be configured to compare the wheel speed of one or more of the wheels 20*a*, 20*b*, 30*a*, 30*b* with a target wheel speed value and to transmit one or more control signals to the controllable device 10 via the communication line 12, wherein the one or more control signals are based on the wheel speed of one or more of the wheels 20*a*, 20*b*, 30*a*, 30*b* and based on the target wheel speed value. For instance, the second ECU 7 may be configured to determine that the wheel speed of one or more of the wheels 20*a*, 20*b*, 30*a*, 30*b* is above the target wheel speed value and to transmit a control signal to the controllable device 10 that prompts the controllable device 10 to decelerate one or more of the wheels 20*a*, 20*b*, 30*a*, 30*b* until their wheel speed reaches the target wheel speed value.

In the following, different modes of operation of the wheel speed sensor system 1 are described. Both the first ECU 6 and the second ECU 7 are configured to determine if the other ECU is operational or malfunctioning. For example, as long as the first ECU 6 is operational it may continually transmit a first status signal to the second ECU 7, for example via the bidirectional data link 15 or via the CAN BUS 18. Once the second ECU 7 no longer receives the first status signal from the first ECU 6, the second ECU 7 may determine that the first ECU 6 is no longer operational or that the first ECU 6 is malfunctioning. Similarly, as long as the second ECU 7 is operational it may continually transmit a second status signal to the first ECU 6, for example via the bidirectional data link 15 or via the CAN BUS 18. Once the first ECU 6 no longer receives the second status signal from the second ECU 7, the first ECU 6 may determine that the second ECU 7 is no longer operational or that the second ECU 7 is malfunctioning.

In a standard mode of operation of the wheel speed sensor system 1 in which both the first ECU 6 and the second ECU 7 are operational, the first ECU 6 receives the first wheel speed data produced by the first ASIC 4 via the data link 8 between the first ASIC 4 and the first ECU 6, and receives the second wheel speed data produced by the second ASIC 5 via the data link 9 between the second ASIC 5 and the second ECU 7 and via the bidirectional data link 15 between the second ECU 7 and the first ECU 6. In the standard mode of operation, the first ECU 6 operates as the master control unit meaning that the first ECU 6 produces the control data or control signals for controlling the controllable device 10 and transmits the control data or control signals produced by the first ECU 6 to the controllable device via the data link 11 between the first ECU 6 and the controllable device 10. It is understood that due to the symmetry of the architecture of the wheel speed sensor system 1 the role of the first ECU 6 and of the second ECU 7 in the standard mode of operation could be reversed. In other words, it is conceivable that in the standard mode of operation the second ECU 7 could operate as the master control unit instead of the first ECU 6.

In a first failure mode of the wheel speed sensor system 1 in which the first ECU 6 is operational and the second ECU 7 is not operational or malfunctioning, the first ECU 6 receives the first wheel speed data produced by the first ASIC 4 via the data link 8 between the first ASIC 4 and the first ECU 6, and receives the second wheel speed data produced by the second ASIC 5 via the data link 13 directly connecting the second ASIC 5 with the first ECU 6. In the first failure mode, the first ECU 6 operates as the master control unit, as described above with reference to the standard mode of operation.

In a second failure mode of the wheel speed sensor system 1 in which the second ECU 7 is operational and the first ECU 6 is not operational or malfunctioning, the second ECU 7 receives the first wheel speed data produced by the first ASIC 4 via the data link 14 directly connecting the first ASIC 4 with the second ECU 7, and receives the second wheel speed data produced by the second ASIC 5 via the data link 9 between the second ASIC 5 and the second ECU 7. In the second failure mode, the second ECU 7 operates as the master control unit meaning that the second ECU 7 produces the control data or control signals for controlling the controllable device 10 and transmits the control data or control signals produced by the second ECU 7 to the controllable device via the data link 12 between the second ECU 7 and the controllable device 10.

The invention claimed is:

1. A wheel speed sensor system, comprising:
one or more first wheel speed sensors;
a first application specific integrated circuit (ASIC) configured to receive one or more first wheel speed signals from the one or more first wheel speed sensors and to convert the one or more first wheel speed signals to first wheel speed data;
a first electronic control unit (ECU) configured to receive the first wheel speed data from the first ASIC via a data link between the first ECU and the first ASIC, the first ECU being independent from the first ASIC;
one or more second wheel speed sensors;
a second ASIC configured to receive one or more second wheel speed signals from the one or more second wheel speed sensors and to convert the one or more second wheel speed signals to second wheel speed data;
a second ECU configured to receive the second wheel speed data from the second ASIC via a data link between the second ECU and the second ASIC, the second ECU being independent from the second ASIC;
a first printed circuit board (PCB) on which the first ASIC and the first ECU are disposed, wherein the first PCB is independent from the first ECU and the first ASIC; and
a second PCB on which the second ASIC and the second ECU are disposed, wherein the second PCB is independent from the second ECU and the second ASIC and separate from the first PCB;
wherein the first ECU is further configured to receive the second wheel speed data from the second ASIC via a data link between the first ECU and the second ASIC, and wherein the second ECU is further configured to receive the first wheel speed data from the first ASIC via a data link between the second ECU and the first ASIC.

2. The wheel speed sensor system of claim 1, further comprising at least one controllable device;
wherein the first ECU is configured to process the first wheel speed data and the second wheel speed data received by the first ECU to produce control data, and to control the at least one controllable device based on the control data produced by the first ECU; and
wherein the second ECU is configured to process the first wheel speed data and the second wheel speed data received by the second ECU to produce the control data, and to control the at least one controllable device based on the control data produced by the second ECU.

3. The wheel speed sensor system of claim 2, wherein the at least one controllable device comprises at least one electric motor, in particular for driving a hydraulic piston for producing a hydraulic brake pressure.

4. The wheel speed sensor system of claim 2, wherein the first ECU is configured to determine whether the second ECU is defective, and wherein, if the first ECU determines that the second ECU is defective, the first ECU is configured to control the controllable device based on the control data produced by the first ECU.

5. The wheel speed sensor system of claim 2, wherein the second ECU is configured to determine whether the first ECU is defective, and wherein, if the second ECU determines that the first ECU is defective, the second ECU is configured to control the controllable device based on the control data produced by the second ECU.

6. The wheel speed sensor system of claim 1, wherein the first ECU is configured to transmit the first wheel speed data received by the first ECU to the second ECU via a bidirectional data link between the first ECU and the second ECU, and/or wherein the second ECU is configured to transmit the second wheel speed data received by the second ECU to the first ECU via the bidirectional data link between the first ECU and the second ECU.

7. The wheel speed sensor system of claim 6, wherein in a standard mode of operation when both the first ECU and the second ECU are operational, the first ECU is configured to receive the second wheel speed data from the second ECU via the bidirectional data link between the first ECU and the second ECU, and to operate as a master ECU, wherein the first ECU operating as the master ECU includes the first ECU controlling the controllable device based on the control data produced by the first ECU.

8. The wheel speed sensor system of claim 1, further comprising a CAN BUS, wherein the first ECU and the second ECU are configured to exchange at least one of the first wheel speed data, the second wheel speed data and the control data via the CAN BUS.

9. A method of processing wheel speed signals, comprising:
transmitting one or more first wheel speed signals from one or more first wheel speed sensors to a first application specific integrated circuit (ASIC),
converting the one or more first wheel speed signals to first wheel speed data using the first ASIC, and
transmitting the first wheel speed data from the first ASIC to a first electronic control unit (ECU) via a data link between the first ASIC and the first ECU, the first ECU being independent from the first ASIC, and transmitting the first wheel speed data from the first ASIC to a second ECU via a data link between the first ASIC and the second ECU;
transmitting one or more second wheel speed signals from one or more second wheel speed sensors to a second ASIC, the second ASIC being independent from the second ECU,
converting the one or more second wheel speed signals to first wheel speed data using the second ASIC, and
transmitting the second wheel speed data from the second ASIC to the second ECU via a data link between the second ASIC and the second ECU, and transmitting the second wheel speed data from the second ASIC to the first ECU via a data link between the second ASIC and the first ECU,
wherein the first ASIC and the first ECU are disposed on a first printed circuit board (PCB) which is independent from the first ECU and the first ASIC, and the second ASIC and the second ECU are disposed on a second PCB which is independent from the second ECU and the second ASIC and separate from the first PCB.

10. The method of claim 9, further comprising:
processing the first wheel speed data and the second wheel speed data received by the first ECU to produce control data, and
controlling at least one controllable device based on the control data produced by the first ECU; or
processing the first wheel speed data and the second wheel speed data received by the second ECU to produce the control data, and
controlling the at least one controllable device based on the control data produced by the second ECU.

11. The method of claim 10, further comprising:
determining whether the second ECU is defective, and if it is determined that the second ECU is defective, controlling the controllable device based on the control data produced by the first ECU; and determining whether the first ECU is defective, and if it is determined that the first ECU is defective, controlling the controllable device based on the control data produced by the second ECU.

12. The method of claim 9, further comprising:

transmitting the first wheel speed data received by the first ECU from the first ECU to the second ECU via a bidirectional data link between the first ECU and the second ECU, and/or transmitting the second wheel speed data received by the second ECU from the second ECU to the first ECU via the bidirectional data link between the first ECU and the second ECU.

13. The method of claim 9, further comprising in a standard mode of operation when both the first ECU and the second ECU are operational:

transmitting the second wheel speed data received by the second ECU from the second ECU to the first ECU via the bidirectional data link between the first ECU and the second ECU, and controlling the controllable device based on the control data produced by the first ECU based on the first wheel speed data received by the first ECU via the data link between the first ASIC and the first ECU and based on the second wheel speed data received by the first ECU via the bidirectional data link between the first ECU and the second ECU.

* * * * *